US009262886B2

(12) United States Patent
Anderson et al.

(10) Patent No.: US 9,262,886 B2

(45) Date of Patent: Feb. 16, 2016

(54) PROCESSING WAGERING GAME EVENTS

(75) Inventors: Peter R. Anderson, Glenview, IL (US); Damon E. Gura, Chicago, IL (US)

(73) Assignee: Bally Gaming, Inc., Las Vegas, NV (US)

(*) Notice: Subject to any disclaimer, the term of this patent is extended or adjusted under 35 U.S.C. 154(b) by 1463 days.

(21) Appl. No.: 12/447,361

(22) PCT Filed: Oct. 27, 2007

(86) PCT No.: PCT/US2007/082758

§ 371 (c)(1), (2), (4) Date: Apr. 27, 2009

(87) PCT Pub. No.: WO2008/052207

PCT Pub. Date: May 2, 2008

(65) Prior Publication Data

US 2010/0048292 A1 Feb. 25, 2010

Related U.S. Application Data

(60) Provisional application No. 60/863,273, filed on Oct. 26, 2006.

(51) Int. Cl.

*A63F 9/24* (2006.01)
*A63F 13/00* (2014.01)
*G06F 17/00* (2006.01)
*G06F 19/00* (2011.01)
*G07F 17/32* (2006.01)

(52) U.S. Cl.

CPC ............ *G07F 17/3227* (2013.01); *G07F 17/32* (2013.01)

(58) Field of Classification Search

CPC ............................ G07F 17/32; G07F 17/3227
USPC ......................................... 463/16, 20, 25, 42
See application file for complete search history.

(56) References Cited

U.S. PATENT DOCUMENTS

| | | | | |
|---|---|---|---|---|
| 4,270,182 | A | 5/1981 | Asija | |
| 6,394,900 | B1 | 5/2002 | McGlone et al. | |
| 6,656,040 | B1 | 12/2003 | Brosnan et al. | |
| 7,125,333 | B2 | 10/2006 | Brosnan | |
| 7,303,475 | B2 * | 12/2007 | Britt et al. | 463/42 |
| 7,523,471 | B1 * | 4/2009 | Dorn et al. | 719/331 |
| 2004/0204226 | A1 * | 10/2004 | Foster et al. | 463/20 |
| 2004/0224770 | A1 * | 11/2004 | Wolf et al. | 463/42 |

(Continued)

OTHER PUBLICATIONS

"PCT Application No. PCT/US2007/082758 International Preliminary Report on Patentability", Mar. 19, 2009 , 7 pages.

(Continued)

*Primary Examiner* — William H McCulloch, Jr.
*Assistant Examiner* — Wei Lee
(74) *Attorney, Agent, or Firm* — DeLizio Law, PLLC

(57) ABSTRACT

This description describes techniques for processing events in a wagering game machine. In some embodiments, a wagering game machine includes a game controller configured to instantiate a game state element based on game state element generation information and game state types, wherein the game state element is configured to present a wagering game, and wherein the game state element includes states, wherein each state includes behaviors. The wagering game machine can also include an event controller to notify the game state element about events, wherein the events cause the game state element to move between the states and to perform the behaviors.

4 Claims, 11 Drawing Sheets

(56) References Cited

U.S. PATENT DOCUMENTS

| | | | |
|---|---|---|---|
| 2005/0059453 | A1 | 3/2005 | Benbrahim et al. |
| 2006/0212474 | A1 | 9/2006 | McCormack et al. |

OTHER PUBLICATIONS

"PCT Application No. PCT/US2007/082758 International Search Report", Apr. 18, 2008 , 9 pages.

* cited by examiner

PROCESSING WAGERING GAME EVENTS

RELATED APPLICATIONS

This application claims the priority benefit of U.S. Provisional Application Ser. No. 60/863,273 filed Oct. 27, 2006.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, WMS Gaming, Inc.

FIELD

Embodiments of the inventive subject matter relate generally to wagering game systems and, more particularly, to wagering game systems that record and process events.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

A wagering game machine comprising a game controller configured to instantiate a game state element based on game state element generation information and game state types, wherein the game state element is configured to present a wagering game, and wherein the game state element includes states, wherein each state includes behaviors; and an event controller to notify the game state element about events, wherein the events cause the game state element to move between the states and to perform the behaviors.

In some embodiments, the game state element is associated with a game piece that is used in the wagering game, and wherein the events are player inputs associated with the game piece.

In some embodiments, the events indicate player inputs associated with the wagering game.

In some embodiments, some of the behaviors define operations for presenting the wagering game.

In some embodiments, the game state element generation information and game state types include object-oriented classes, and, in some embodiments, game state element generation information identifies the game state types.

In some embodiments, the game controller includes an interpreter.

In some embodiments, the game state element is associated with a game piece in the wagering game.

A method comprising receiving information indicating a set of game state elements to be used in presenting a wagering game, wherein each of the game state elements defines states and behaviors; creating the game state elements using the information; and presenting a wagering game using the game state elements, wherein presenting the wagering game includes, receiving an event; determining which of game state elements is to be notified of the event; and notifying the game state elements about the event.

In some embodiments, the information includes a scripting language file, and wherein the creating of the game state elements is performed by interpreting the script.

In some embodiments, the information includes program code defining object-oriented classes, and wherein the creating the game state elements includes instantiating objects based on the object-oriented classes.

In some embodiments, the determining is based on information contained in the event.

In some embodiments, some of the game state elements are associated with game pieces used in the wagering game.

In some embodiments, the method is further comprising determining, in the game state element, a current state, wherein the determining is based on the event; and performing the behaviors of the game state element.

In some embodiments, some of the behaviors define operations for presenting media as part of the wagering game.

A machine-readable medium including instructions that are executable by a machine, the instructions including instructions to detect events, wherein some of the events indicate player input associated with a wagering game, and wherein others of the events indicate machine-generated responses associated with the wagering game; instructions to move between states based on the events, wherein some of the states are associated with a game piece used in the wagering game, and wherein the states define operations for presenting a portion of the wagering game; and instructions to perform the operations for presenting the portion of the wagering game.

In some embodiments, the instructions are part of an object instantiated from object-oriented classes defining the states and operations.

In some embodiments, the instructions to perform the operations for presenting the portion of the wagering game include instructions to access media files.

In some embodiments, the instructions are represented in a scripting language.

In some embodiments, the instructions are represented in Lua source code.

In some embodiments, the instructions define objected-oriented classes, and wherein the instructions include source code for a scripting language.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into six sections. The first section provides an introduction to embodiments of the invention, while the second section describes example wagering game machine architectures. The third section describes example operations performed by some embodiments and the fourth section describes example wagering game machines in more detail. The fifth section includes a code sample. The sixth section presents some general comments.

INTRODUCTION

This section provides an introduction to some embodiments of the invention. Some embodiments include wagering game machines that generate and process events in the course of presenting wagering games. The events can represent player inputs (e.g., button presses), machine-generated responses (e.g., timers expiring, completion of animations, etc.), and other occurrences in a wagering game system. In some embodiments, wagering game machines include logic that defines a discrete set of states relating to the events. When the logic detects events, it can move between states and perform operations associated with the states. For example, when a player presses a slot machine's "bet one" button, the machine can generate an event representing the button press. The machine can process the event using the states and operations.

Figure 1:
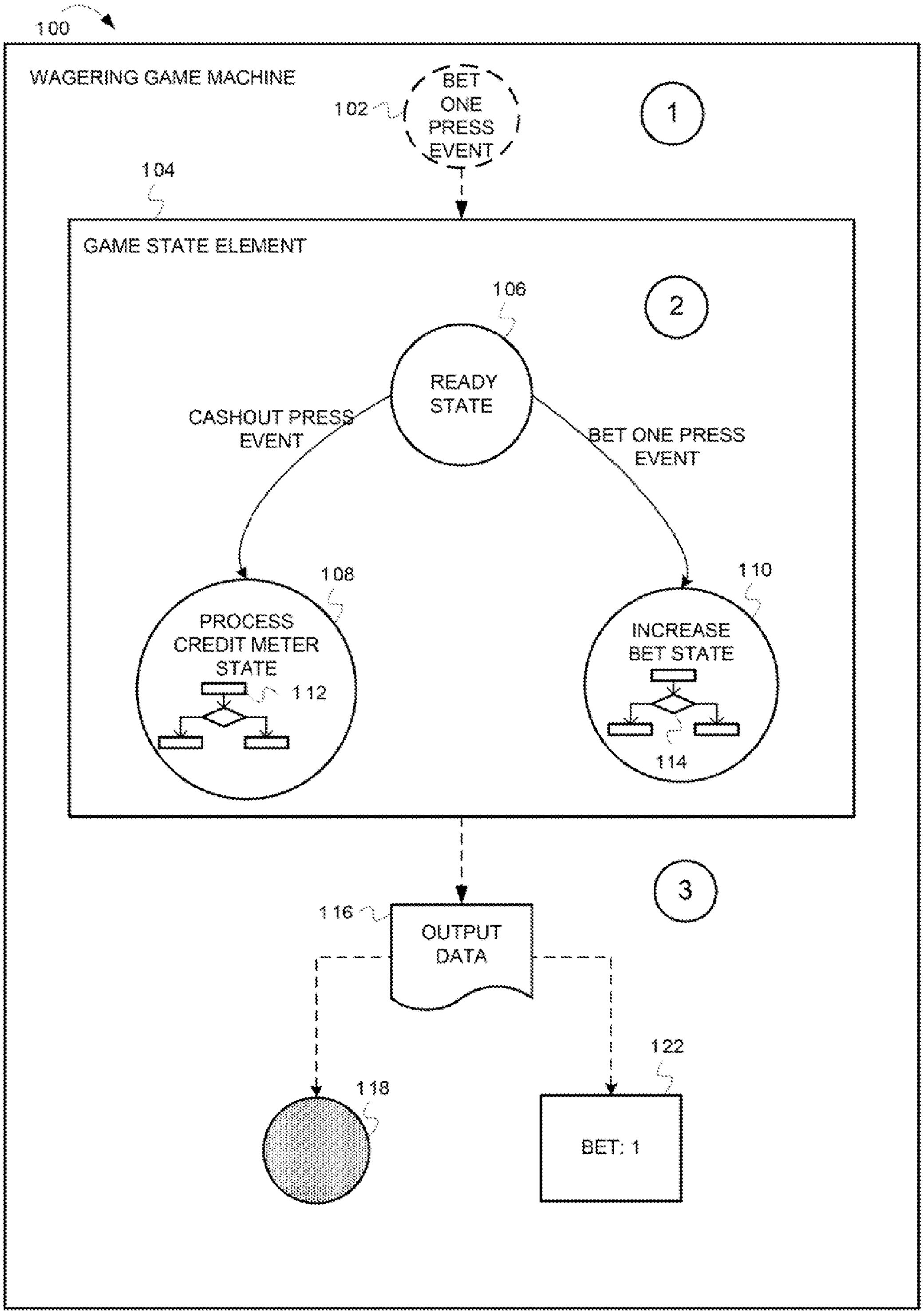
FIG. 1 is a dataflow diagram illustrating dataflow and operations associated with events and states in a wagering game machine, according to example embodiments of the invention.

In some embodiments, the logic for processing wagering game events is implemented using a script interpreter and script (i.e., a scripting language file). For example, the logic for determining a game result can be included in a script. To determine the game results, the script interpreter interprets and executes the script. One benefit of implementing event logic using a script is that the script interpreter can execute the script without first compiling and linking the script (i.e., without pre-execution processing). This allows technicians (or the wagering game machine itself) to replace event logic without shutting down the machine to compile and link the new event logic. Another benefit of using script is that script is typically more human-readable than other programming languages, so it can make game development more manageable. FIG. 1 provides an introduction to some embodiments of the event processing logic.

FIG. 1 is a dataflow diagram illustrating dataflow and operations associated with events and states in a wagering game machine, according to example embodiments of the invention. FIG. 1 shows a wagering game machine 100 that includes a game state element 104 and output devices 118 and 122 (i.e., audio device 118 and display device 122). The game state element 104 includes logic that defines states (i.e., "ready state" 106, "increase bet state" 110, and "process credit meter state" 108) associated with a wagering game. The events (i.e., "cash-out press event" and "bet one press event") cause the game state element 104 to transition between states. When the game state element 104 makes a transition to a new state, it can perform operations associated with the new state (i.e., operations 112 or 114).

In FIG. 1, the dataflow occurs in three stages. Before stage one, the game state element 104 is in the "ready" state 106. During stage one, the game state element 104 is notified of a bet one event 102, which indicates that a player has pressed a "bet one" button. During stage two, the bet one press event 102 causes the game state element 104 to move from the "ready" state 106 to the "increase bet" state 110. After entering the "increase bet" state 110, the game state element 104 performs operations 114, which record the bet. During stage three, as a result of the operations 114, the game state element 104 transmits output data 116 to one or more output devices 118 & 122. The operations 114 can cause a bet meter 122 to indicate that a player has bet one credit. The operations 112 can perform operations for zeroing-out a credit meter and presenting any associated graphics and sounds.

Although FIG. 1 describes some embodiments, the following sections describe many other features and embodiments.

Wagering Game Machine Architectures

This section presents FIGS. 2-5, which describe example architectures according to embodiments of the invention. This section continues with a discussion of FIG. 2.

Figure 2:
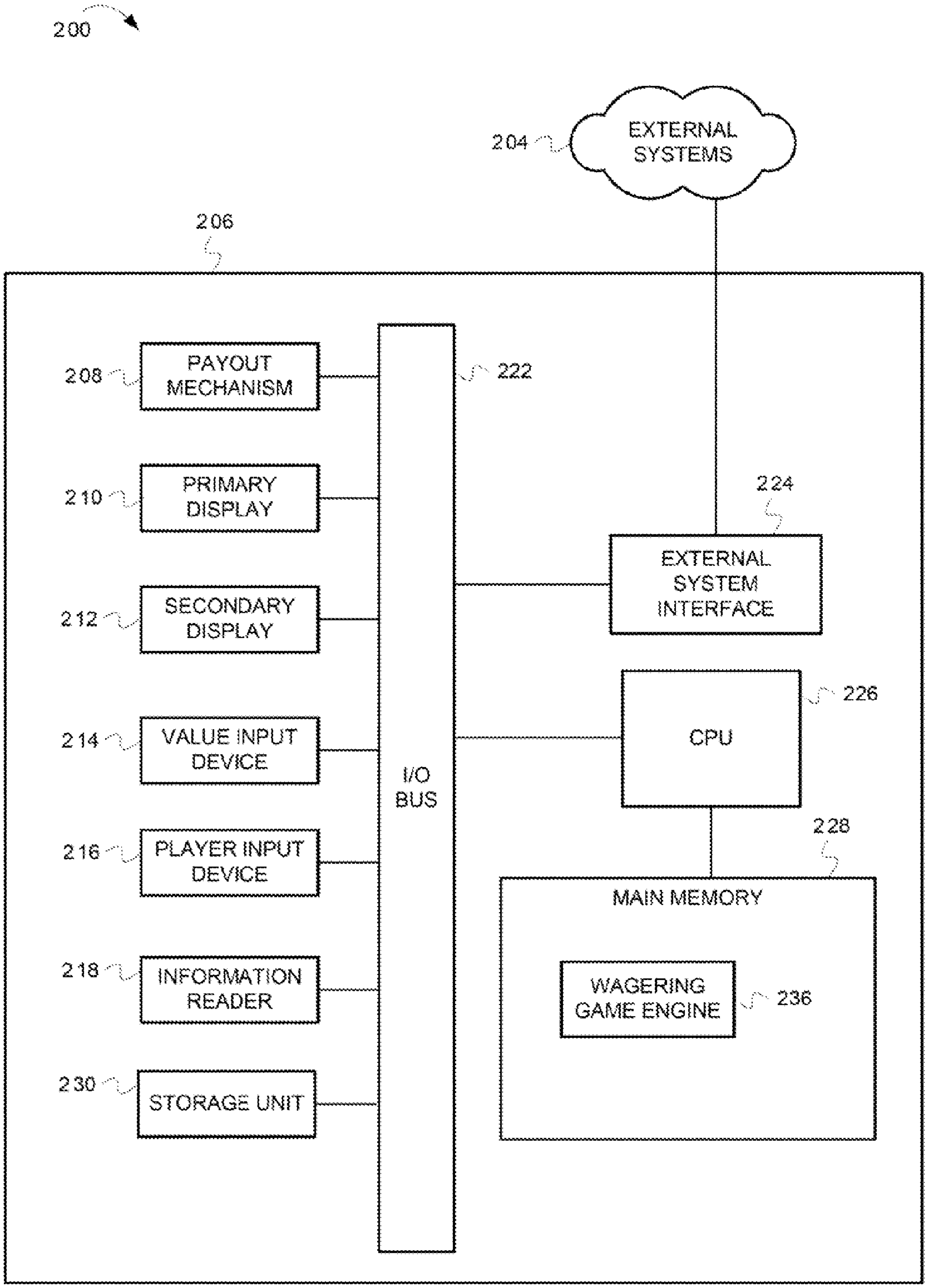
FIG. 2 is a block diagram illustrating a wagering game machine architecture, according to example embodiments of the invention.

FIG. 2 is a block diagram illustrating a wagering game machine architecture, according to example embodiments of the invention. As shown in FIG. 2, the wagering game machine architecture 200 includes a wagering game machine 206, which includes a central processing unit (CPU) 226 connected to main memory 228. The CPU 226 can include any suitable processor, such as an Intel® Pentium processor, Intel® Core 2 Duo processor, AMD Opteron™ processor, UltraSPARC processor, etc. The main memory 228 includes a wagering game engine 236. In some embodiments, the wagering game engine 236 includes components (e.g., game state elements) that represent game pieces and game logic. The components can include discreet sets of states, and events can prompt transitions between the states. In some embodiments, the wagering game engine 236 can present wagering games, such as video poker, video black jack, video slots, video lottery, etc., in whole or part.

The CPU 226 is connected to an input/output (I/O) bus 222, which can include any suitable bus technologies, such as an AGTL+ frontside bus and a PCI backside bus. The I/O bus 222 is connected to a payout mechanism 208, primary display 210, secondary display 212, value input device 214, player input device 216, information reader 218, and storage unit 230. The player input device 216 can include the value input device 214 to the extent the player input device 216 is used to place wagers. The I/O bus 222 is also connected to an external system interface 224, which is connected to external systems 204 (e.g., wagering game networks).

In one embodiment, the wagering game machine 206 can include additional peripheral devices and/or more than one of each component shown in FIG. 2. For example, in one embodiment, the wagering game machine 206 can include multiple external system interfaces 224 and/or multiple CPUs 226. In one embodiment, any of the components can be integrated or subdivided. Furthermore, in some embodiments, components shown inside the main memory 228 can be moved outside the main memory 228 (e.g., the components can be included in controllers, chips, or other devices in the wagering game machine 206).

Any component of the architecture 200 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

This section continues with a more detailed description of embodiments of a wagering game engine.

Figure 3:
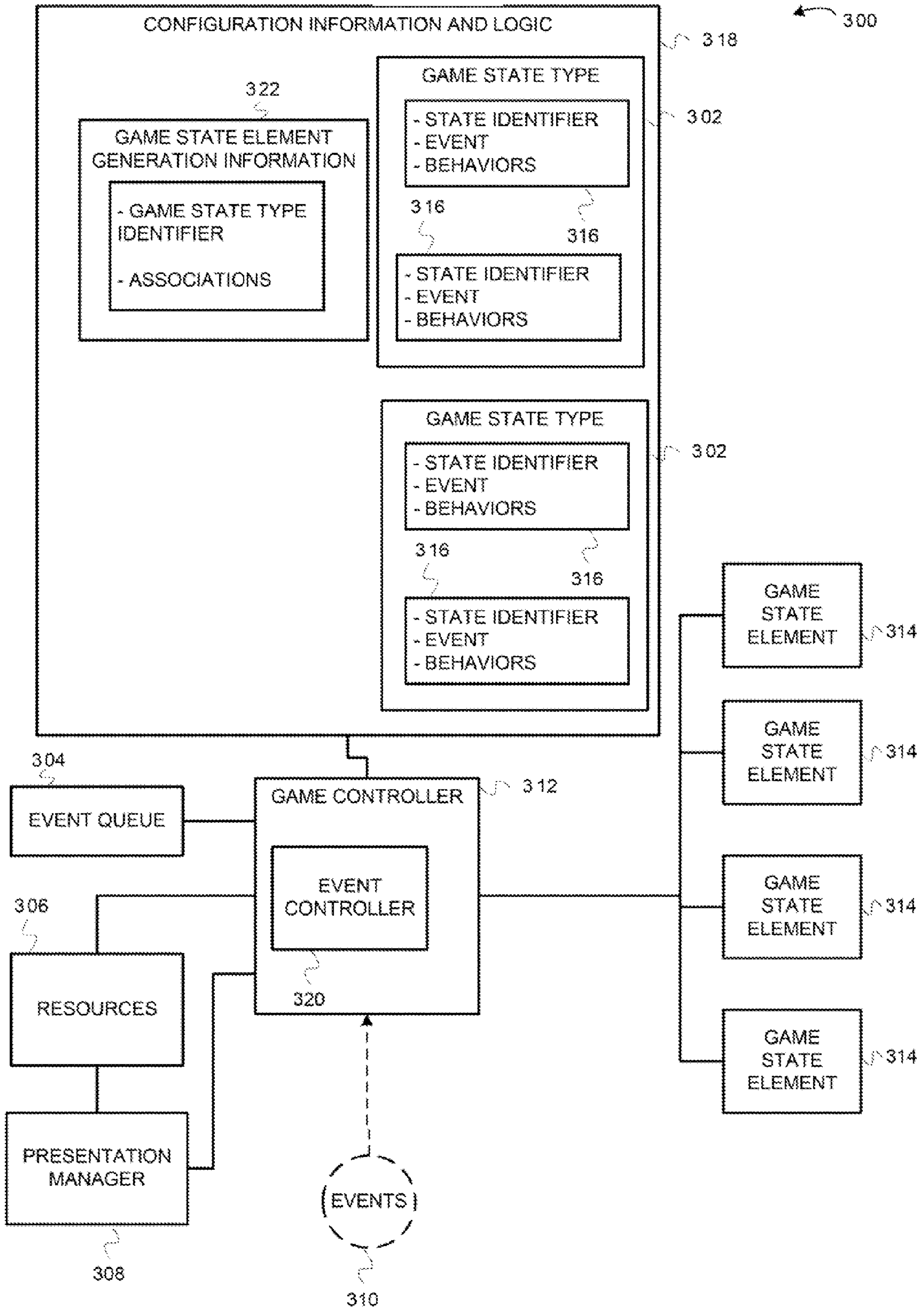
FIG. 3 is a block diagram illustrating a wagering game engine, according to example embodiments of the invention.

FIG. 3 is a block diagram illustrating a wagering game engine, according to example embodiments of the invention. In FIG. 3, the game engine 300 includes a game controller 312, which includes an event controller 320. The game controller 312 is connected to a plurality of game state elements 314, presentation manager 308, resources 306, event queue 304, and configuration information and logic 318. The resources 306 are connected to the presentation manager 308.

The configuration information and logic 318 includes game state element generation information 322 and a plurality of game state types 302. Each game state type 302 includes a plurality of state identifiers, events, and behaviors 316. The state identifiers can identify states associated with game state elements of a wagering game, while the events can identify occurrences that elicit transitions between the states. The behaviors can identify operations to perform after entering a state. In some embodiments, the behaviors can indicate that no operations are performed when a state is entered. States, events, and behaviors will be described in more detail below (see discussion of FIG. 4).

In some embodiments, the game state types 302 and game state element generation information 322 are object-oriented classes. In some embodiments, the game state element generation information 322 is an object-oriented class that uses classes defined in the game state types 302. For example, the game state element generation information's game state type identifier can indicate a game state type 302 that includes a class which can be used in creating one of the game state elements 314. The classes can include source code from any suitable object-oriented programming language, including high-level languages (e.g., Java, C++, etc.), scripting languages (e.g., Lua, Python, etc.), etc.

The game controller 312 can use the game state element generation information 322 and game state types 302 to create the game state elements 314. In some embodiments, the game controller 312 includes an interpreter that creates the game state elements 314 by instantiating objects, where the objects are defined by classes included in the game state types 302 and game state element generation information 322. In other embodiments, the game controller 312 includes executable program code that creates the game state elements 314 based on information in the game state types 302 and game state element generation information 322. After creating the game state elements 314, the game engine 300 can present a wagering game by processing the events 310.

The event controller 320 can store events 310 in the event queue 304. The events 310 can represent player inputs (e.g., button presses), machine-generated responses (e.g., timers expiring, completion of animations, etc.), and other occurrences in a wagering game system. In some embodiments, the events 310 can include an event identifier, event data, and/or a destination game state element. The event controller 320 can pass the events 310 to the game state elements 314. In some embodiments, the event controller 320 passes all the events to all the game state elements 314. In other embodiments, the event controller 320 forwards only certain events to certain game state elements 314. That is, the event controller 320 can act as an event filter. For example, a first game state element 314 may process button-related events, while a second game state element 314 may process events related to receipt of coins. The game controller 312 can forward button events to the first game state element 314, while passing coin-related events to the second game state element 314.

The resources 306 can include text, audio content, video content, animation content, and/or any other information useful in presenting a wagering game. The resources 306 are accessible to the game state elements 314. For example, a game state element's behaviors can define operations for accessing and presenting audio content stored in the resources 306. Similarly, a game state element may access and present audio content stored the resources 306. The presentation manager 308 can assist the game state elements 314 in presenting media. In some embodiments, game designers can change a wagering game's look and feel by changing content in the resources 306.

Figure 4:
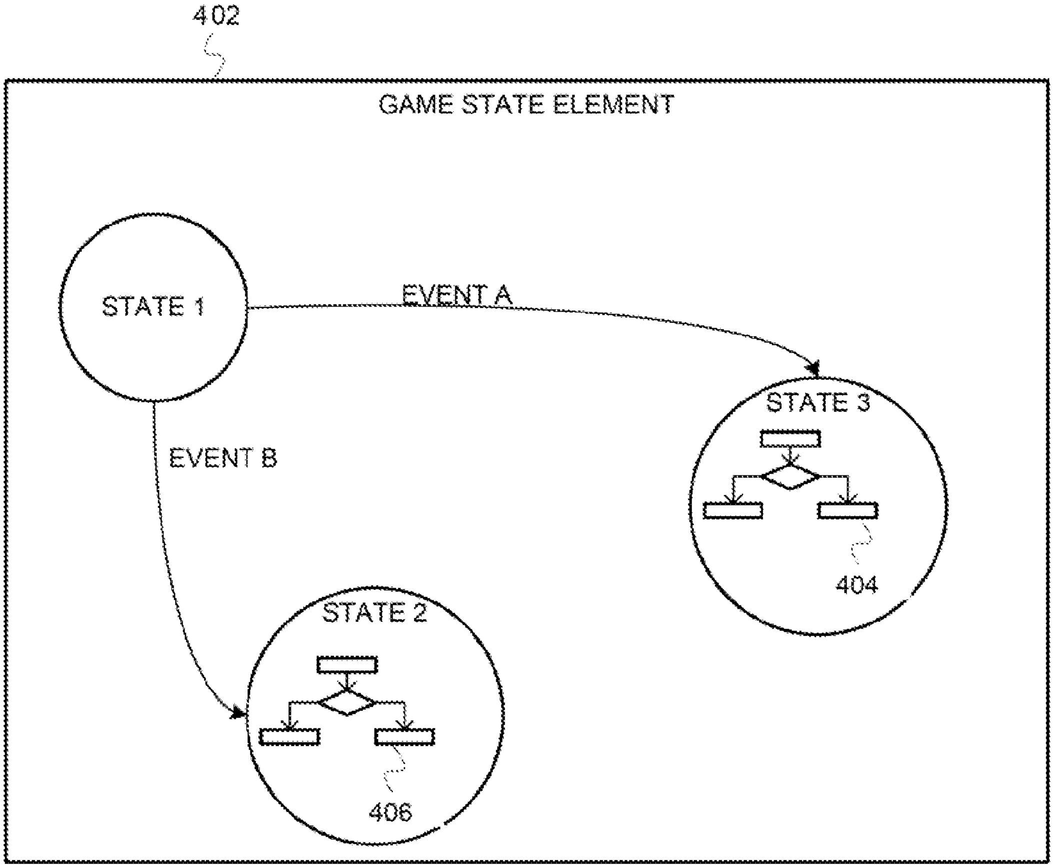
FIG. 4 is a block diagram illustrating a game state element, according to example embodiments of the invention.

As noted above, game state elements include logic that defines states, events, and behaviors. FIG. 4 describes game state elements in more detail.

FIG. 4 is a block diagram illustrating a game state element, according to example embodiments of the invention. As shown in FIG. 4, the game state element 402 includes state 1, state 2, and state 3. Also, the game state element 402 includes event A and event B.

At any given time, the game state element 402 is in one of the states 1, 2, or 3. In some embodiments, the game state element 402 can include different states and events, where it could be in more than one state at any given time. Events cause the game state element 402 to move between states. For example, if the game state element 402 were in state 1, it would move to state 2 after detecting event B. Upon entering state 2, the game state element 402 can perform the behaviors 406. In some embodiments, the behaviors 406 represent operations for presenting a portion of a wagering game, such as operations for presenting video content on a display device, determining game results, etc. Although not shown in FIG. 4, the game state element 402 includes logic (e.g., variables, tables, registers, program code, circuits, etc.) that tracks current states and performs behaviors.

Game state elements can be associated with game pieces or other aspects of game control. For example, a game engine can present a card game using a game state element for each card used in the card game and game state elements for controlling the cards, betting, and other aspects of the card game. The card-related game state elements could be notified of events that represent player inputs affecting the cards. The card-related game state elements can perform behaviors that respond to the events. For example, the card-related game state elements can respond to player input by presenting graphics indicating that a card is face-up or face-down.

To illustrate further, the card-related game state elements can be similar to those shown in FIG. 4. Referring to FIG. 4, state 1 can indicate that the playing card is available for selection from a deck, state 2 can indicate that the playing card was drawn and held face-up, and state 3 can indicate that the playing card was drawn and held face-down. Event A can be associated with player inputs, such as touchscreen presses indicating the card has been drawn and held face-down. Event B can be associated with player inputs, such as touchscreen presses indicating that the playing card has been drawn and held face-up. The game state element behaviors 404 & 406 can include operations that graphically show the playing card face-up and face-down.

Figure 5:
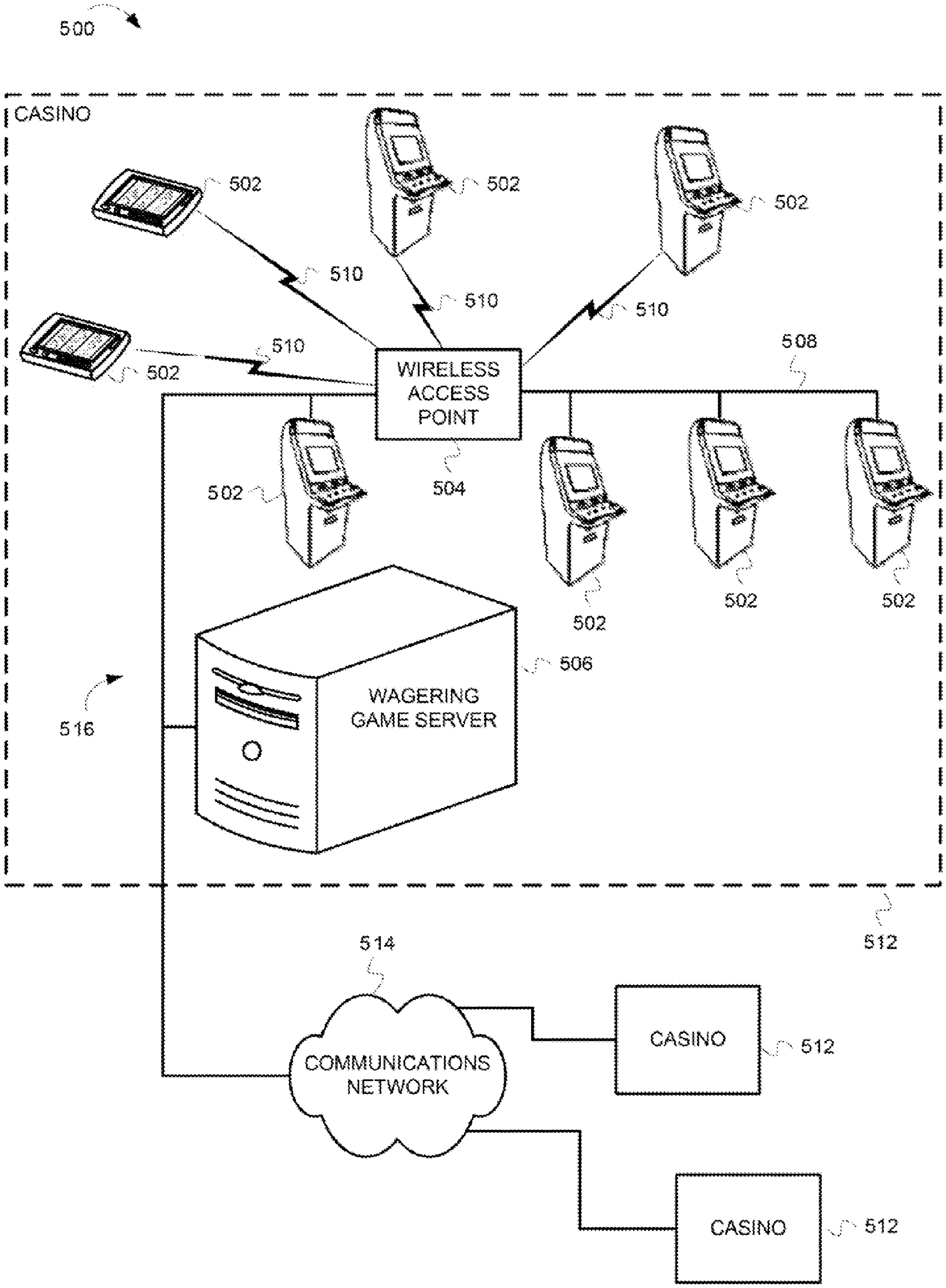
FIG. 5 is a block diagram illustrating a wagering game network 500, according to example embodiments of the invention.

While FIGS. 2-4 describe wagering game machine components, FIG. 5 describes a wagering game network.

FIG. 5 is a block diagram illustrating a wagering game network 500, according to example embodiments of the invention. As shown in FIG. 5, the wagering game network 500 includes a plurality of casinos 512 connected to a communications network 514.

Each of the plurality of casinos 512 includes a local area network 516, which may include a wireless access point 504, wagering game machines 502, and a wagering game server 506 that can serve wagering games over the local area network 516. The local area network 516 includes wireless communication links 510 and wired communication links 508. The wired and wireless communication links can employ any suitable connection technology, such as Bluetooth, 802.11, Ethernet, public switched telephone networks, SONET, etc. In one embodiment, the wagering game server 506 can serve wagering games and/or distribute content to devices located in other casinos 512 or at other locations on the communications network 514.

Although not shown, the wagering game machines 502 can include game engines, as described above. The wagering game machines described herein can take any suitable form, such as floor standing models, handheld mobile units, bartop models, workstation-type console models, etc. Furthermore, the wagering game machines 502 can be primarily dedicated for use in conducting wagering games, or can include non-dedicated devices, such as mobile phones, personal digital assistants, personal computers, etc.

Any component of the gaming network 500 (e.g., the wagering game machines 502 and wagering game server 506) can include hardware and machine-readable media including instructions for performing the operations described herein. In one embodiment, the wagering game network 500 can include other network devices, such as accounting servers, wide area progressive servers, player tracking servers, and/or other devices suitable for use in connection with embodiments of the invention.

In various embodiments, wagering game machines 502 and wagering game servers 506 work together such that a wagering game machine 502 may be operated as a thin, thick, or intermediate client. For example, one or more aspects of game play may be controlled by the wagering game machine 502 (client) or the wagering game server 506 (server). That is, in some embodiments, game engines can reside in the wagering game machines 502 and/or the game server 506. In a thin-client example, the wagering game server 506 can perform functions such as determining game outcome or managing assets, while the wagering game machine 502 can present the graphical representation of such outcome to a user (e.g., player). In a thick-client example, game outcome may be determined locally (e.g., by a game engine in a wagering game machine 502) and then communicated to the wagering game server 506 for recording or managing a player's account.

Similarly, functionality that is not directly related to game play may be controlled by the wagering game machine 502 (client) or the wagering game server 506 (server). For example, power conservation controls that manage a display screen's light intensity may be managed centrally (e.g., by the wagering game server 506) or locally (e.g., by the wagering game machine 502). Other functionality not directly related to game play may include presentation of advertising, software or firmware updates, system quality or security checks, etc.

Operations

This section describes operations performed by embodiments of the invention. In the discussion below, the flow diagrams will be described with reference to the block diagrams presented above. In certain embodiments, the operations are performed by executing instructions residing on machine-readable media (e.g., software), while in other embodiments, the operations are performed by hardware and/or other logic (e.g., firmware). In some embodiments, the operations are performed in series, while in other embodiments, one or more of the operations can be performed in parallel. This section begins with, a discussion of operations for initializing a game engine.

Figure 6:
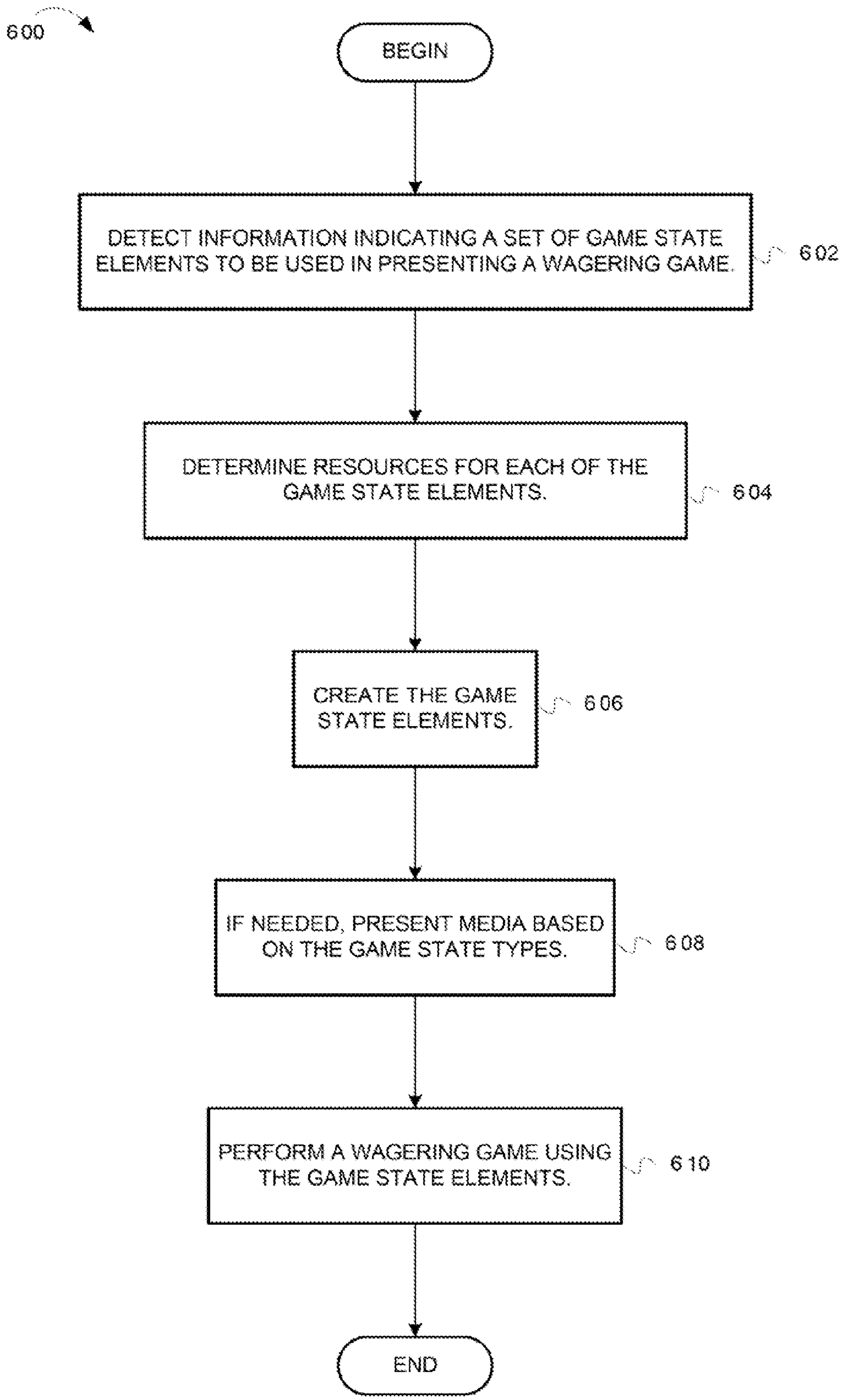
FIG. 6 is a flow diagram illustrating operations for initializing a game engine, according to example embodiments of the invention.

FIG. 6 is a flow diagram illustrating operations for initializing a game engine, according to example embodiments of the invention. The flow 600 begins at block 602.

At block 602, the game controller 312 is notified of information indicating a set of game state elements to be used in presenting a wagering game. In some embodiments, the information is represented as interpretable source code that includes object-oriented class definitions defining a set of game state elements. The game state types 302 and game state element generation information 322 can include the object-oriented class definitions. In other embodiments, the information is represented as binary data that includes information from the game state types 302 and game state element generation information 322. The flow continues at block 604.

At block 604, the game controller 312 determines resources for each of the game state elements. In some embodiments, the information at block 602 indicates which of the resources 306 are associated with each game state element. The resources 306 can include media such as audio content, video content, animations, text, and/or any other information needed by a game state element. The flow continues at block 606.

At block 606, the game controller 312 creates the game state elements 314. In some embodiments, the game controller 312 creates the game elements 314 by interpreting source code (received at block 602) that includes class definitions defining a set of game state elements and instantiating the game state elements 314. In other embodiments, the game controller 312 creates the game state elements 314 using binary data (received at block 602) that defines the game state elements' states, events, and behaviors. The flow continues at block 608.

At block 608, if needed, the game controller 312 presents media associated with one or more of the game state elements 314. For example, some of the game state elements 314 can be associated with game pieces, such as playing cards, selectable game elements, etc. Thus, the game controller 312 can present graphics, sounds, and/or other media to reveal the game pieces. Some of the game state elements 314 may not be associated with media. The flow continues at block 610.

At block 610, the game engine 300 presents a wagering game using the game state elements 314. For example, alter revealing the game pieces, the game state elements 314 process events and perform operations that present a wagering game. Operations performed by some embodiments of a game state element will be described in more detail below (see discussion of FIG. 8).

This section continues by discussing operations for processing events.

Figure 7:
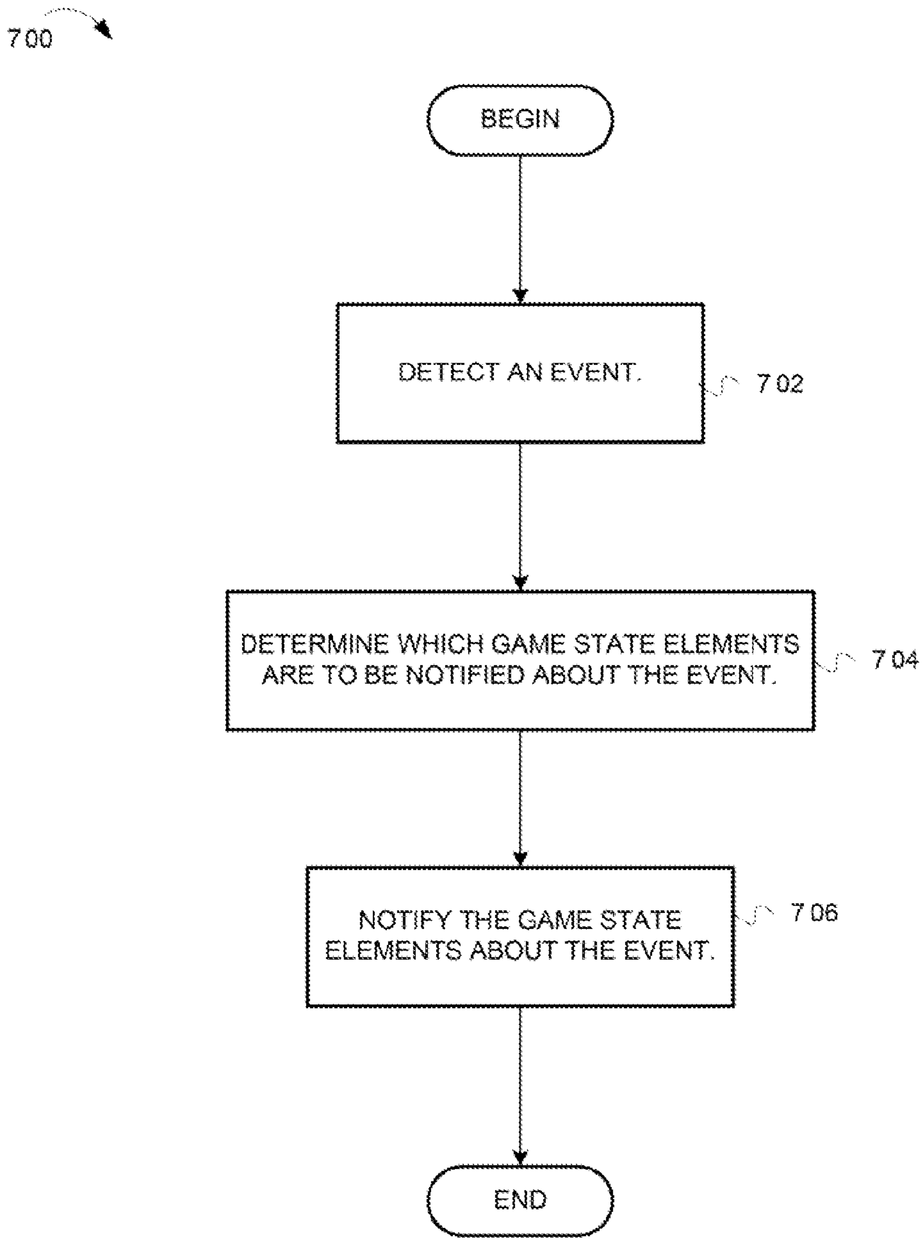
FIG. 7 is a flow diagram illustrating operations for processing events in a game engine, according to example embodiments of the invention.

FIG. 7 is a flow diagram illustrating operations for processing events in a game engine, according to example embodiments of the invention. The flow 700 begins at block 702.

At block 702, the event controller 320 detects an event 310. As noted above, events can indicate user input, machine-generated results, and other occurrences in a wagering game machine and/or wagering game network. The flow continues at block 704.

At block 704, the event controller 320 determines which of the game state elements 314 are to be notified of the event. In some embodiments, the event controller 320 forwards the event to all the game elements 314. In other embodiments, the event controller 314 determines what events about which it will notify the different game state elements 314. The flow continues at block 706.

At block 706, the event controller 320 notifies the game state element(s) 314 about the event. From block 706, the flow ends.

While FIG. 7 describes operations for notifying game state elements about events received in a game engine, this section continues by describing how events affect game states and elicit various behaviors.

Figure 8:
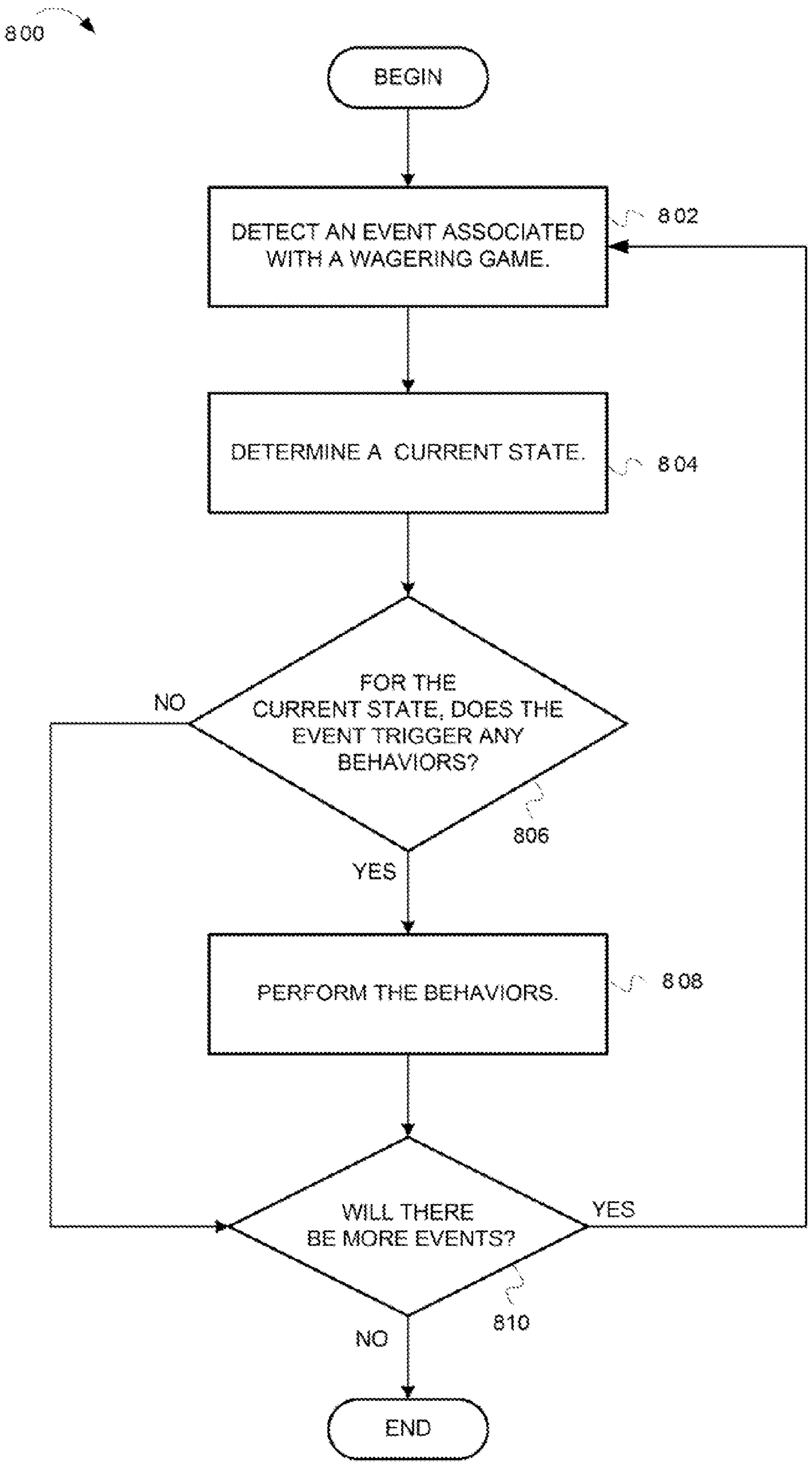
FIG. 8 is a flow diagram illustrating operations for processing events in a game state element, according to example embodiments of the invention.

FIG. 8 is a flow diagram illustrating operations for processing events in a game state element, according to example embodiments of the invention. The flow 800 begins at block 802.

At block 802, a game state element is notified of an event associated with the wagering game. For example, referring to FIG. 4, the game state element 402 is notified of event A from an event controller. The flow continues at block 804.

At block 804, the game state element determines a state, based on the event. For example, referring to FIG. 4, if the game state element 402 were in state 1 when it is notified of event A (at block 802), it would move to state 3. The flow continues at block 806.

At block 806, the game state element determines whether the event triggers behaviors for the current state. For example, the game state element 402 determines whether state 3 includes behaviors. If there are behaviors for the current state, the flow continues at block 808. Otherwise, the flow continues at block 810.

At block 808, the game state element performs the behaviors. For example, upon entering state 3, the game state element 402 performs the behaviors 404. In some embodiments, the behaviors include operations for presenting part of wagering game. For example, the behaviors 404 can include operations for presenting graphics that represent actions of a playing card, such as turning the card face up, discarding the card, etc. Additionally, the behaviors can include other operations related to wagering games, such as operations for recording wagering game results, recording gaming session statistics, etc. The flow continues at block 810.

At block 810, the game state element determines whether there will be more events. For example, the game state element 402 determines whether it has reached a terminal state. If there wilt be no more events, the flow ends. Otherwise, the flow continues at block 802.

This section will conclude with a discussion about how game engines can process replacement game state types and game state element generation information. As noted above, the game state types 302 and game state element generation information 322 can include source code (e.g., a script) defining object-oriented classes, where the classes can be used to create the game state elements 312. As also noted above, the game controller 312 can include an interpreter (e.g., a scripting language interpreter) that instantiates the game state elements 314 based on the classes in the source code. In embodiments where the game controller 312 includes an interpreter, technicians can replace game state types 302 while the game engine is running. When the replacement code is needed, the game controller's interpreter can interpret the replacement code at runtime. Therefore, these embodiments can avoid shutting-down the game engine to recompile and relink the source code.

In some embodiments, after presenting a wagering game, a game engine can be reconfigured to present a different wagering game. For example, the game controller 312 can load new state element generation information 322 that defines game state elements 314 for a different wagering game. In some embodiments, technicians (or system processes) can change a wagering game's look and feel by changing associations to resources in the game state element generation information 322. For example, technicians can change the game state element generation information's associations to resources to include different animation files. As a result, because animation files have been changed, the wagering games' game pieces will look different.

Sample Game State Types

This section shows some example game state types. The following code segment serves as an example of how some embodiments can represent game state types in program code.

```
module (..., package.seeall)
require "Column"
require "PillarOrbAnimation"
require "PillarKeyAnimation"
require "PillarAttract"
-- Bonus game states ...
local ANIM_PREBONUS    = "ANIM-PREBONUS"
local PILLAR_BONUS     = "PILLAR-BONUS"
local REVEAL_ALL       = "REVEAL_ALL"
local SHOW_POOPER      = "SHOW_POOPER"
local function PillarGameConstructor(self)
    StateMachine.CStateMachine.init(self, "obPillarGame", ANIM_PREBONUS);
    self.strPillarStage = "PillarStage"
    self.strPillarBackground = "PillarBG"
```

-continued

```
        self.strCrownText = "CrownText"
        self.strCreditsMeterText = "CreditsMeterText"
        self.strTotalBetMeterText = "TotalBetMeterText"
        self.strBonusWonMeterText = "BonusWonMeterText"
        self.strCreditsMeter = "CreditMeter"
        self.strTotalBetMeter = "TotalBetMeter"
        self.strBonusWonMeter = "BonusMeter"
        self.1stColumns = { }
        self.obStateFunctions[ANIM__PREBONUS] = nil
        self.obStateFunctions[PILLAR__BONUS] = nil
        self.obStatefunctions[REVEAL__ALL] = nil
end
CPillarGame = class.class(StateMachine.CStateMachine, PillarGameConstructor);
function CPillarGame:Start ( )
        obStartAnimation:Perform(self.ShowPillarBonus, self)
        self:SetState(ANIM__PREBONUS)
end
function CPillarGame:CreatePillarBackground( )
        CreateImage(self.strPillarStage,
                        self.strPillarBackground, "Bonus1__BG", 0, 0,
0);
        ObjectCommand(self.strPillarStage, self.strPillarBackground, "Show");
end
function CPillarGame:CreateColumns( )
        for i = 1, 28 do
                self.1stColumns[1] = Column.CColumn(i, self.strPillarStage);
                self.1stColumns[1]:Show(true)
        end
end
function CPillarGame:CreateCrownText( )
        CreateImage(self.strPillarStage,
                                self.strCrownText, "Orbs__Awarded", 356,
101, 10);
        ObjectCommand(self.strPillarStage, self.strCrownText, "Show");
end
function CPillarGame:CreateMeters( )
        CreateImage(self.strPillarStage,
                                self.strCreditsMeterText,
"METER__B1__Credits", 73, 535, 110);
        CreateImage(self.strPillarStage,
                        self.strTotalBetMeterText, "METER__B1__TotalBet",
335, 535, 110);
        CreateImage(self.strPillarStage,
                        self.strBonusWonMeterText, "METER__B1__BonusWon",
579, 535, 110);
        CreateMeter(self.strPillarStage, self.strCreditsMeter);
        CreateMeter(self.strPillarStage, self.strTotalBetMeter);
        CreateMeter(self.strPillarStage, self.strBonusWonMeter);
        local nTotalBet = GetTotalBet( );
        local nCredits = GetCredits( );
        ObjectCommanad(self.strPillarStage,
                                    self.strCreditsMeter, "SetValue
" .. nCredits);
        ObjectCommand(self.strPillarStage,
                                    self.strTotalBetMeter, "SetValue
" .. nTotalBet);
        ObjectCommand(self.strPillarStage, self.strBonusWonMeter, "SetValue
0");
        ObjectCommand(self.strPillarStage, self.strCreditsMeterText, "Show");
        ObjectCommand(self.strPillarStage, self.strTotalBetMeterText, "Show");
        ObjectCommand(self.strPillarStage, self.strBonusWonMeterText, "Show");
        ObjectCommand(self.strPillarStage, self.strCreditsMeter, "Show");
        ObjectCommand(self.strPillarStage, self.strTotalBetMeter, "Show");
        ObjectCommand(self.strPillarStage, self.strBonusWonMeter, "Show");
end
function CPillarGame:Initialize( )
        CreateStage(self.strPillarStage, 500);
        self:CreatePillarBackground( )
        self:CreateColumns( )
        self:CreateCrownText( )
        self:CreateMeters( )
        Sparks.CreateSparks(self.strPillarStage)
        PillarOrbAnimation.CPillarOrbAnimation(self.strPillarStage)
        PillarKeyAnimation.CPillarKeyAnimation(self.strPillarStage)
        PillarAttract.CPillarAttract(self.strPillarStage)
end
```

-continued

```
function CPillarGame:ShowPillarBonus( )
    ShowStage(self.strPillarStage);
    self.SetState(PILLAR__BONUS);
end
function CPillarGame:BangCreditMeter( )
    ObjectCommand(self.strPillarStage,
            self.strBonusWonMeter, “Bang ” ..
BonusMath.nCreditsSelected);
end
function CPillarGame:DisableColumns(obExcept)
    for i = 1,28 do
        if self.1stColumns[i].strName -= obExcept.strName then
            self.1stColumns[i]:Disable( );
        end
    end
end
function CPillarGame:AttractColumn(nIndex)
    if self.1stColumns[nIndex] then
        self.1stColumns[Index]:Attract( );
    end
end
function CPillarGame:RevealAllColumns( )
    for i = 1,28 do
        self.1stColumns[i]:Reveal( );
    end
end
function CPillarGame:StartPooperAnimation( )
    self:RevealAllColumns( )
    self:SetState(REVEAL__ALL)
    Delay(3000);
    self:SetState(SHOW__POOPER)
    obEndAnimation:Perform(self.HideAll, self)
end
function CPillarGame:HideAll( )
    HideStage(self.strPillarStage);
end
```

Figure 9:
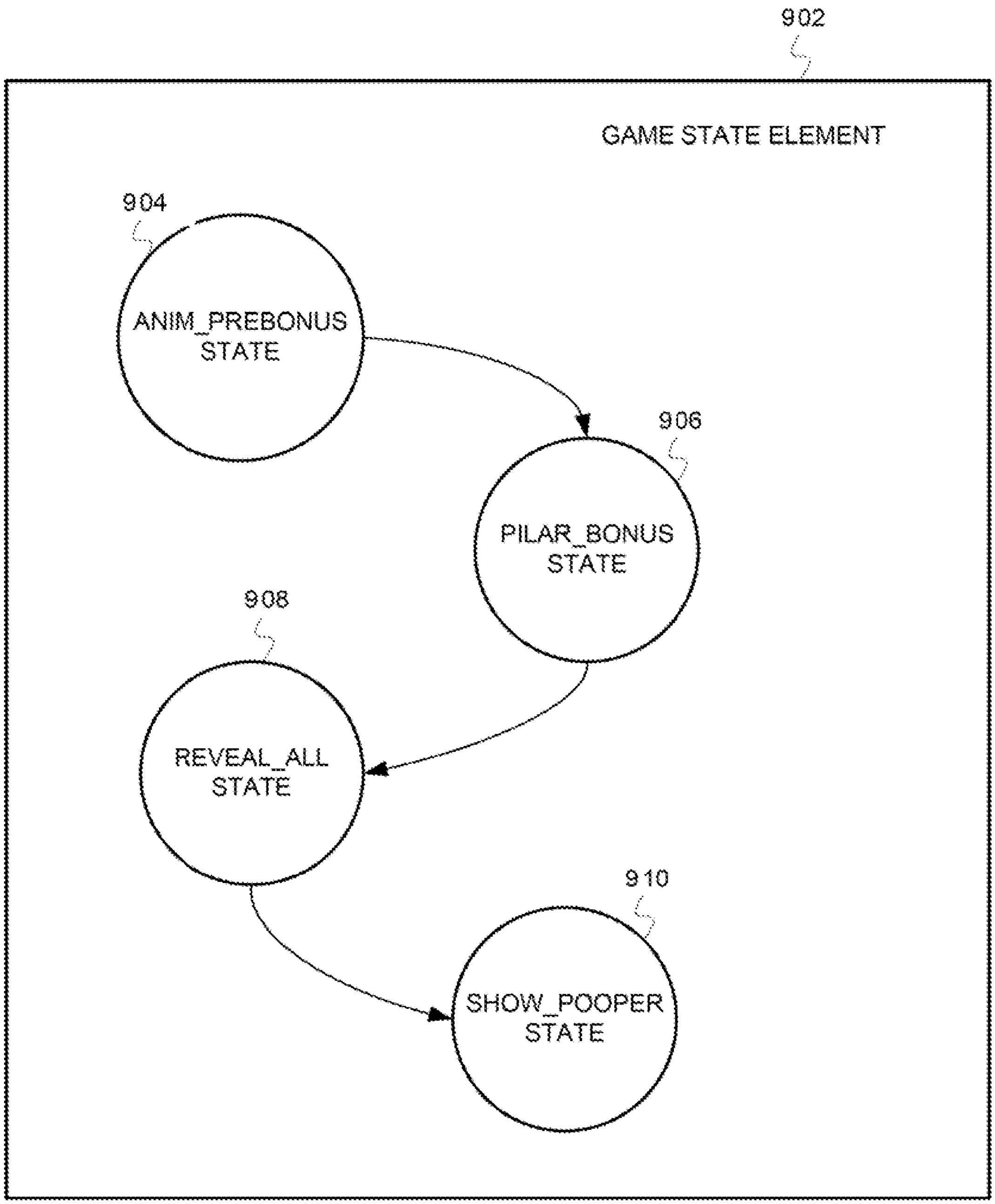
FIG. 9 is a block diagram illustrating a game state element including states defined in a sample code segment, according to example embodiments of the invention

The game state types in the code sample define game state elements that control a bonus game. The game state elements that control the bonus game can be used with other game state elements, such as game state elements associated with game pieces and game controls. FIG. 9 is a block diagram illustrating a game state element including states defined in a sample code segment, according to example embodiments of the invention. In FIG. 9, the game state element 902 includes states defined in the sample code segment shown above. In particular, the game state element 902 includes an ANIM_PREBONUS state 904, PILAR_BONUS state 906, REVEAL_ALL state 908, and a SHOW_POOPER state 910.

More about Game Engines and Scripts

Figure 10:
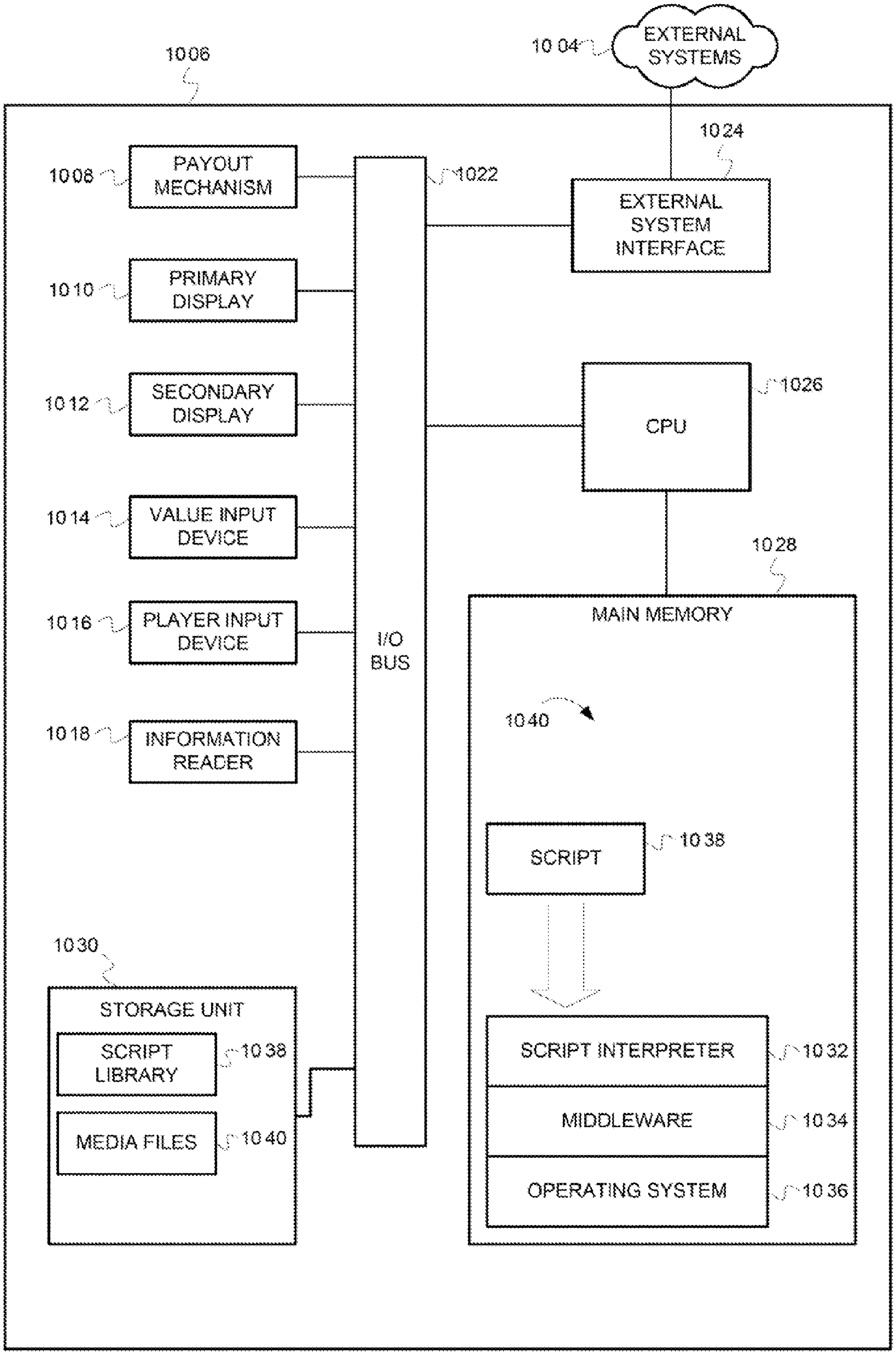
FIG. 10 is a block diagram illustrating a wagering game machine including a script interpreter and script, according to example embodiments of the invention.

This section describes additional details about game engines and scripts. As noted above, the game engine can include a script interpreter and script (i.e., a scripting language file). FIG. 10 is a block diagram illustrating a wagering game machine including a script interpreter and script, according to some embodiments of the invention. The wagering game 1006 includes the same components as the wagering game machine 206 of FIG. 2. However, in FIG. 10, the wagering game machine's main memory 1028 includes an operating system 1036, middleware 1034, script interpreter 1032, and script 1038. Furthermore, in FIG. 10, the wagering game machine's storage unit 1030 includes a script library 1038 and media files 1040.

In the main memory 1028, the operating system 1036 can be any operating system suitable for a wagering game machine, such as adaptations of Linux and Windows. The middleware 1034 provides a layer of abstraction between the operating system 1036 and the script interpreter 1032, script 1038, and other application programs (not shown). That is, the script interpreter 1032 and script 1038 request services from the middleware 1034 that they would typically request from an operating system. In turn, the middleware 1034 provides those services. Because the script 1038, script interpreter 1032, and other application programs are designed to request services from the middleware, they can operate with any operating system compatible with the middleware 1034. For example, if the middleware is compatible with Linux, Windows, and Solaris, the script 1038 and script interpreter 1032 can present wagering games when the operating system 1036 is Linux, Windows, or Solaris.

The script interpreter 1032 can include any suitable scripting language interpreter, such as a Lua interpreter, Python interpreter, etc. In some embodiments, the script interpreter 1032 is an embodiment of the game controller 312 of FIG. 3. The script 1038 can include one or more files including scripting language code (e.g., text), such as Lua code, Python code, etc. The script 1038 can define and instantiate game state elements (see 314 in FIG. 3) and a presentation manager (see 308). Thus, after the script interpreter 1032 interprets and executes a portion of the script 1038, the script 1038 represents the components used in presenting a wagering game (see FIG. 3).

As noted above, the storage unit 1030 includes a script library 1038. The script library 1038 can include portions of the script 1038 that are not needed in main memory 1028. When contents of the script library 1038 are needed in main memory 1028, the script interpreter 1032 (with the assistance of the middleware 1034 and operating system 1036) can load them into main memory 1028 as part of the script 1038. Furthermore, the script library 1038 can include configuration information and logic (see 318 in FIG. 3).

During operation, the wagering game machine 1006 processes events and presents wagering games. For example, the operating system 1036 can detect player input, such as input from the player input device 1016. The operating system 1036 can provide a record of the input to the middleware 1034. In turn, the middleware 1034 provides the input to the script 1038, which is being interpreted and executed by the script interpreter 1032. The script 1038 processes the input as an "event" (as described above). The script 1038 processes the event by providing the event to a game state element (a portion of the script 1038) suited for processing the event. For example, if the input indicates that a player pressed a "spin reels" button, the script 1038 provides the event to the game state element capable of determining a result for a slots game. Next, the game state element can determine a result, which can constitute yet another event, which the script 1038 will process. The script 1038 can define data structures that store multiple events for later processing (see discussion of event queue 304). Eventually, the script 1038 will utilize the media files 1040 to graphically audibly present the result to the player.

As discussed above, one or more portions of the script 1038 can be replaced without processing other portions of the script 1038. For example, if technicians want to replace a portion of the script 1038 (e.g., a game state element) that determines results for a slots game, they can replace it without affecting the wagering game machine's ability to present games. After the script portion is replaced, the wagering game machine 1006 can present wagering games without recompiling and relinking the script 1038.

Watering Game Machines

This section describes additional details of wagering game machines in which embodiments of the invention can be practiced.

Figure 11:
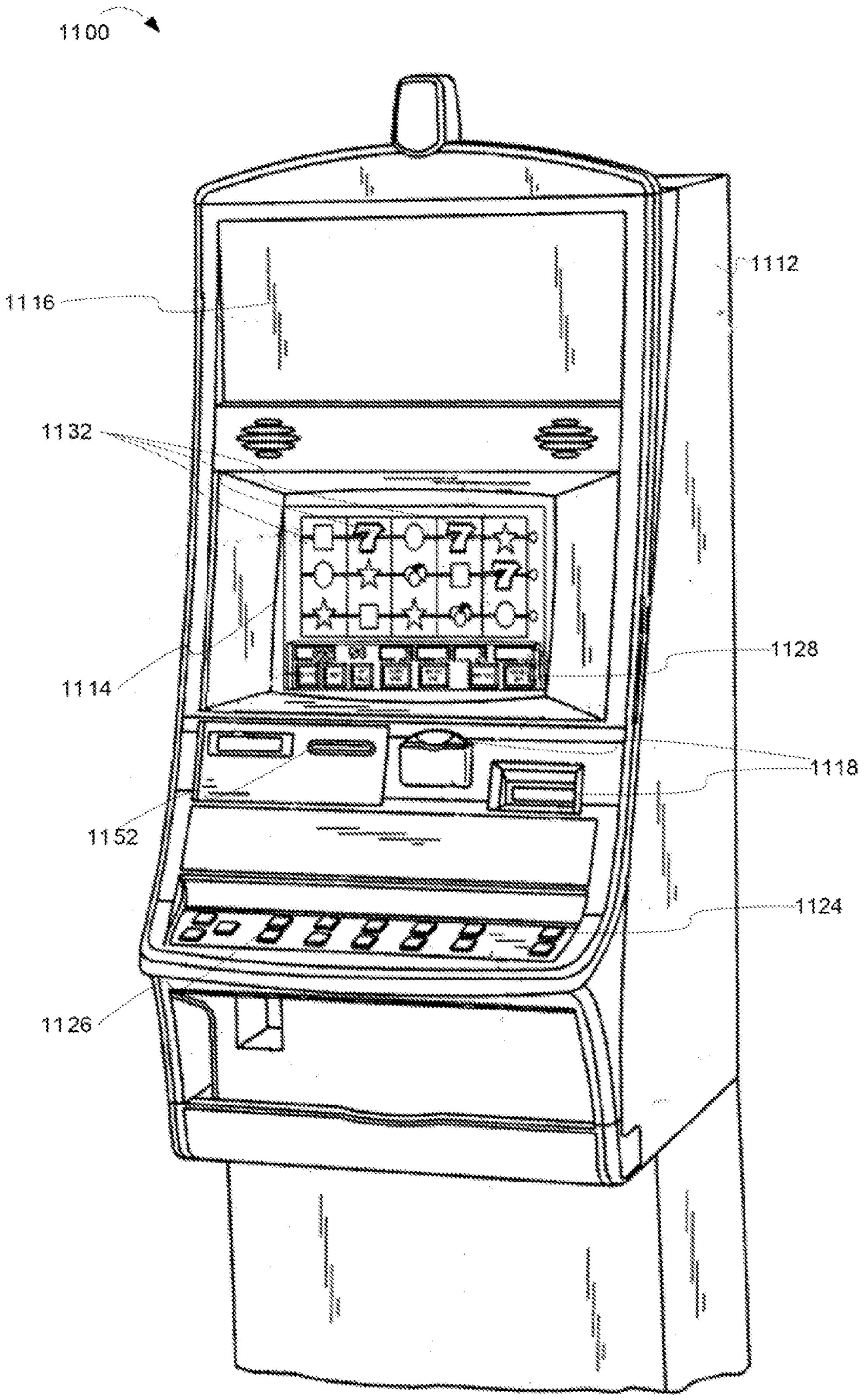
FIG. 11 is a perspective view of a wagering game machine, according to example embodiments of the invention.

FIG. 11 is a perspective view of a wagering game machine, according to example embodiments of the invention. Referring to FIG. 11, a wagering game machine 1100 is used in gaming establishments, such as casinos. According to embodiments, the wagering game machine 1100 can be any type of wagering game machine and can have varying structures and methods of operation. For example, the wagering game machine 1100 can be an electromechanical wagering game machine configured to play mechanical slots, or it can be an electronic wagering game machine configured to play video casino games, such as blackjack, slots, keno, poker, blackjack, roulette, etc.

The wagering game machine 1100 comprises a housing 1112 and includes input devices, including value input devices 1118 and a player input device 1124. For output, the wagering game machine 1100 includes a primary display 1114 for displaying information about a basic wagering game. The primary display 1114 can also display information about a bonus wagering game and a progressive wagering game. The wagering game machine 1100 also includes a secondary display 1116 for displaying wagering game events, wagering game outcomes, and/or signage information. While some components of the wagering game machine 1100 are described herein, numerous other elements can exist and can be used in any number or combination to create varying forms of the wagering game machine 1100.

The value input devices 1118 can take any suitable form and can be located on the front of the housing 1112. The value input devices 1118 can receive currency and/or credits inserted by a player. The value input devices 1118 can include coin acceptors for receiving coin currency and bill acceptors for receiving paper currency. Furthermore, the value input devices 1118 can include ticket readers or barcode scanners for reading information stored on vouchers, cards, or other tangible portable storage devices. The vouchers or cards can authorize access to central accounts, which can transfer money to the wagering game machine 1100.

The player input device 1124 comprises a plurality of push buttons on a button panel 1126 for operating the wagering game machine 1100. In addition, or alternatively, the player input device 1124 can comprise a touch screen 1128 mounted over the primary display 1114 and/or secondary display 1116.

The various components of the wagering game machine 1100 can be connected directly to, or contained within, the housing 1112. Alternatively, some of the wagering game machine's components can be located outside of the housing 1112, while being communicatively coupled with the wagering game machine 1100 using any suitable wired, or wireless communication technology.

The operation of the basic wagering game can be displayed to the player on the primary display 1114. The primary display 1114 can also display a bonus game associated with the basic wagering game. The primary display 1114 can include a cathode ray tube (CRT), a high resolution liquid crystal display (LCD), a plasma display, light emitting diodes (LEDs), or any other type of display suitable for use in the wagering game machine 1100. Alternatively, the primary display 1114 can include a number of mechanical reels to display the outcome. In FIG. 11, the wagering game machine 1100 is an "upright" version, in which the primary display 1114 is oriented vertically relative to the player. Alternatively, the wagering game machine can be a "slant-top" version in which the primary display 1114 is slanted at about a thirty-degree angle toward the player of the wagering game machine 1100. In yet another embodiment, the wagering game machine 1100 can exhibit any suitable form factor, such as a free standing model, bartop model, mobile handheld model, or workstation console model.

A player begins playing a basic wagering game by making a wager via the value input device 1118. The player can initiate play by using the player input device's buttons or touch screen 1128. The basic game can include arranging a plurality of symbols along a pay line 1132, which indicates one or more outcomes of the basic game. Such outcomes can be randomly selected in response to player input. At least one of the outcomes, which can include any variation or combination of symbols, can trigger a bonus game.

In some embodiments, the wagering game machine 1100 can also include an information reader 1152, which can include a card reader, ticket reader, bar code scanner, RFID transceiver, or computer readable storage medium interlace. In some embodiments, the information reader 1152 can be used to award complimentary services, restore game assets, track player habits, etc.

GENERAL

In the following detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The following detailed description does not, therefore, limit embodiments of the invention, which are defined only by the appended claims.

Each of the embodiments described herein are contemplated as failing within the inventive subject matter, which is set forth in the following claims.

The invention claimed is:

1. A computer-implemented method comprising:

instantiating, in one or more memory devices, a plurality of game state elements, wherein the game state elements include scripting language code configured to process events associated with wagering games, and wherein the game state elements are replaceable without code compilation and linking;

instantiating, in the one or more memory devices, an event controller including scripting language code configured to notify ones of the game state elements about certain of the events;

presenting the wagering games, wherein the presenting includes, detecting, in the event controller, events indicating player input and intermediate results of the wagering games;

notifying certain of the game state elements about certain of the events;

controlling, based on the events, game pieces used in the wagering games, wherein the controlling occurs in the game state elements; and presenting, using the game state elements, results for the wagering games.

2. The computer-implemented method of claim 1, wherein the detecting the events includes, receiving, in a middleware component, information from an operating system, wherein the information indicates the player input, wherein the middleware component resides in the one or more memory devices;

generating, in the middleware component, the events based on the player input, and notifying the event controller of the events.

3. The computer-implemented method of claim 2, wherein the middleware component is configured to interact with the operating system and other operating systems.

4. A non-transitory machine-readable storage device medium including instructions executable by a machine, the instructions comprising:

instructions to instantiate a plurality of game state elements, wherein the game state elements include scripting language code configured to process events associated with wagering games, and wherein the game state elements are replaceable without code compilation and linking;

instructions to instantiate an event controller including scripting language code configured to notify ones of the game state elements about certain of the events; instructions to present the wagering games, wherein the presentation includes, detection, in the event controller, of events indicating player input and intermediate results of the wagering games;

notification of certain of the game state elements about certain of the events; control, based on the events, of game pieces used in the wagering games, wherein the control occurs in the game state elements; and presentation, using the game state elements, of results for the wagering games, wherein the presenting the wagering games occurs as a result of a game controller interpreting the event controller's scripting language code and the game state elements' scripting language code.

* * * * *